United States Patent [19]

Powell

[11] Patent Number: 4,566,308

[45] Date of Patent: Jan. 28, 1986

[54] PORTABLE PRESSURE GAUGE TESTER

[75] Inventor: Robert F. Powell, Mount View, England

[73] Assignee: Amerex Corporation, Trussville, Ala.

[21] Appl. No.: 667,988

[22] Filed: Nov. 5, 1984

[51] Int. Cl.$^4$ ............................................. G01F 27/00
[52] U.S. Cl. ..................................................... 73/4 R
[58] Field of Search ................. 73/4 R, 4 V, 4 D, 756

[56] References Cited

U.S. PATENT DOCUMENTS

| 719,968 | 2/1903 | Wood | 73/4 R |
|---|---|---|---|
| 2,207,898 | 7/1940 | Schoenecke | 73/4 R |
| 2,459,769 | 1/1949 | Eck | 73/4 R |
| 3,077,761 | 2/1963 | Morgan | 73/4 R |
| 3,262,305 | 7/1966 | Dawley | 73/4 R |
| 3,398,570 | 8/1968 | Cowen, Jr. et al. | 73/4 R |
| 3,478,571 | 11/1969 | Mounteer | 73/4 R |
| 3,557,602 | 1/1971 | Frantz | 73/4 R |
| 3,826,125 | 7/1974 | Cotton | 73/4 R |
| 3,831,431 | 8/1924 | Morris | 73/4 R |

FOREIGN PATENT DOCUMENTS

| 1112631 | 11/1981 | Canada | 73/4 R |
|---|---|---|---|
| 2240446 | 3/1975 | France | 73/4 R |
| 2071325 | 9/1981 | United Kingdom | 73/4 R |

Primary Examiner—Stewart J. Levy
Assistant Examiner—Tom Noland
Attorney, Agent, or Firm—Woodford R. Thompson, Jr.

[57] ABSTRACT

A gas pressure gauge tester utilizes the pressure equalization perforations in the face of a gas pressure gauge to introduce pressurized gas into the gauge to counterbalance the gas pressure exerted on the gauge from the gas within a storage cylinder associated therewith. The gas pressure gauge to be tested is captured within a bracket which has integrated thereto a conduit connector cooperatively positioned to seal the pressure equalization perforations such that gases may be introduced thereto from a regulated supply of pressurized gas in order to counterbalance the internal pressure of the cylinder associated with the gauge. The amount of pressurization necessary to counterbalance the gas pressure is indicative of both the operability of the gauge and the state of charge of the associated cylinder.

8 Claims, 3 Drawing Figures

PORTABLE PRESSURE GAUGE TESTER

BACKGROUND OF THE INVENTION

The present invention relates generally to gauges utilized to measure the internal gas pressure of a container and more particularly the invention relates to an apparatus and method for testing such gauges without depressurizing the container or damaging the gauge.

Portable gas containers serve a variety of uses, one of which is as a storage container for the so-called stored pressure fire extinguishers, which use a chemical agent propelled from the container by a stream of pressurized gas, such as nitrogen. Mounted on a number of such fire extinguishers is a pressure gauge which indicates the internal pressure, usually 50 to 300 psi. Routine maintenance of these devices requires that the container be periodically checked for proper pressurization. Clearly, then, if the gauge functions properly a simple visual inspection would indicate whether the proper pressurization exists. However, the certainty of the gauge accuracy is a subject of uncertainty in that the gauge may be defective, damaged, or simply stuck. Therefore, it has been common practice in the past to shake, thump, rattle, bump or otherwise attempt to coax some variation in the reading on the gauge in order to assure that the reading is not inaccurate.

Such gauges as hereinabove referred to measure the differential between the internal pressure of the container and the pressure within the cover of said gauge, which is preferably at atmospheric pressure. The pressure within the face cover is equalized to atmospheric pressure by perforations in the cover. Heretofore such perforations have been located in accordance with the gauge manufacturers' fancy. However, the concensus of such manufacturers is increasingly moving toward locating such perforations at the center of the face cover.

SUMMARY OF THE INVENTION

It is an object of the instant invention to utilize such centrally located perforations to:
  (a) provide a simple, efficient, and accurate determination of the operability of the gauge; and
  (b) provide a simple, efficient, and accurate determination of the pressure exerted from within the canister on the gauge mounted thereon.

Another object of the invention is to provide a gauge tester which is compact, portable, and rugged to enable transportation of the gauge tester to various locations for testing gauges of containers in situ.

In order to achieve these objects a gauge tester is provided which utilizes a generally U-shaped engaging bracket having a base connected to a pair of laterally extending members one of which has a threaded bore therethrough and the other of which is slotted to fit over a neck which connects the gauge to its container. An externally threaded end portion of a conduit is threaded through said threaded bore with such end portion of the conduit terminating in an annular seal which presses against the face cover of the gauge about said centrally located perforations, thereby providing an air-tight path to said gauge from a pressurized canister connected to the other end of said conduit.

DESCRIPTION OF THE DRAWINGS

The novel combination of features to be patented herein is set forth in the appended claims, however, an appreciation for the features, objects and advantages of the invention may be gained from reading the description of the preferred embodiment in conjunction with the drawings wherein like reference numerals are used for like components in each figure insofar as practical.

DESCRIPTION OF A PREFERRED EMBODIMENT

Figure 1A:
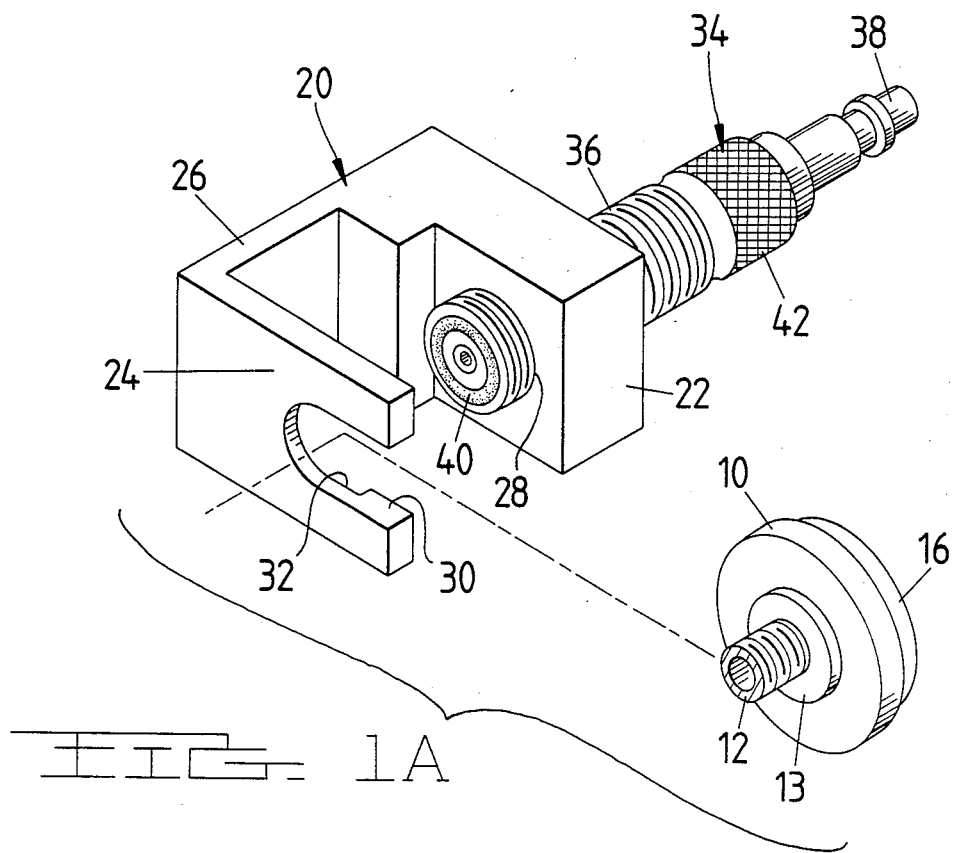
FIG. 1A is an exploded, perspective view showing the bracket and conduit connector removed from a gas pressure gauge.
Figure 1B:
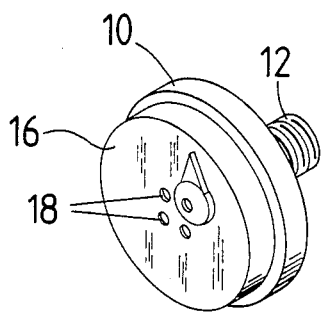
FIG. 1B is a perspective view showing the face of a typical gas pressure gauge with central perforations therein.

With reference to FIGS. 1A and 1B, a typical gas pressure gauge used on stored pressure type fire extinguishers is indicated at 10. Gauge 10 is connected to a cylinder 14 by a neck 12 which extends from the rear of the gauge 10, as shown. Neck 12 provides gaseous communication between the cylinder 14, shown in FIG. 2, and the gauge 10 which measures the differential between the internal pressure within the cylinder and the pressure within face cover 16 of the gauge 10. Normally such internal pressure ranges from 50 to 300 psi and the pressure within the face cover 16 is at atmospheric pressure. To equalize the pressure within the face cover 16 to atmospheric pressure there are provided pressure equalization perforations 18 adjacent the center of face cover 16, as shown in FIG. 1B.

With reference to FIG. 1A, the present invention utilizes an engaging bracket 20 which is substantially U-shaped having a first extension 22 and a second extension 24 connected by a base 26. The first extension 22 has a threaded bore 28 therethrough perpendicular to the adjacent side of the second extension 24. Second extension 24 has an outwardly opening slot 30 therein, as shown. The inner side of the second extension 24 is also recessed, as at 32, adjacent the slot 30 to conform with the adjacent rear portion of gauge 10. That is, slot 30 and recess 32 allow bracket 20 to fit over the gauge 10 without interference from neck 12 and the usual neck collar 13 thereby enabling extension 24 to achieve substantial surface area contact with the gauge 10. It is to be understood that although the illustration shows bracket 20 as being somewhat angular, such bracket may be rounded or ornamentally designed so long as extensions 22 and 24 remain substantially parallel so that extension 24 maintains substantial surface area contact with the gauge 10.

Figure 2:
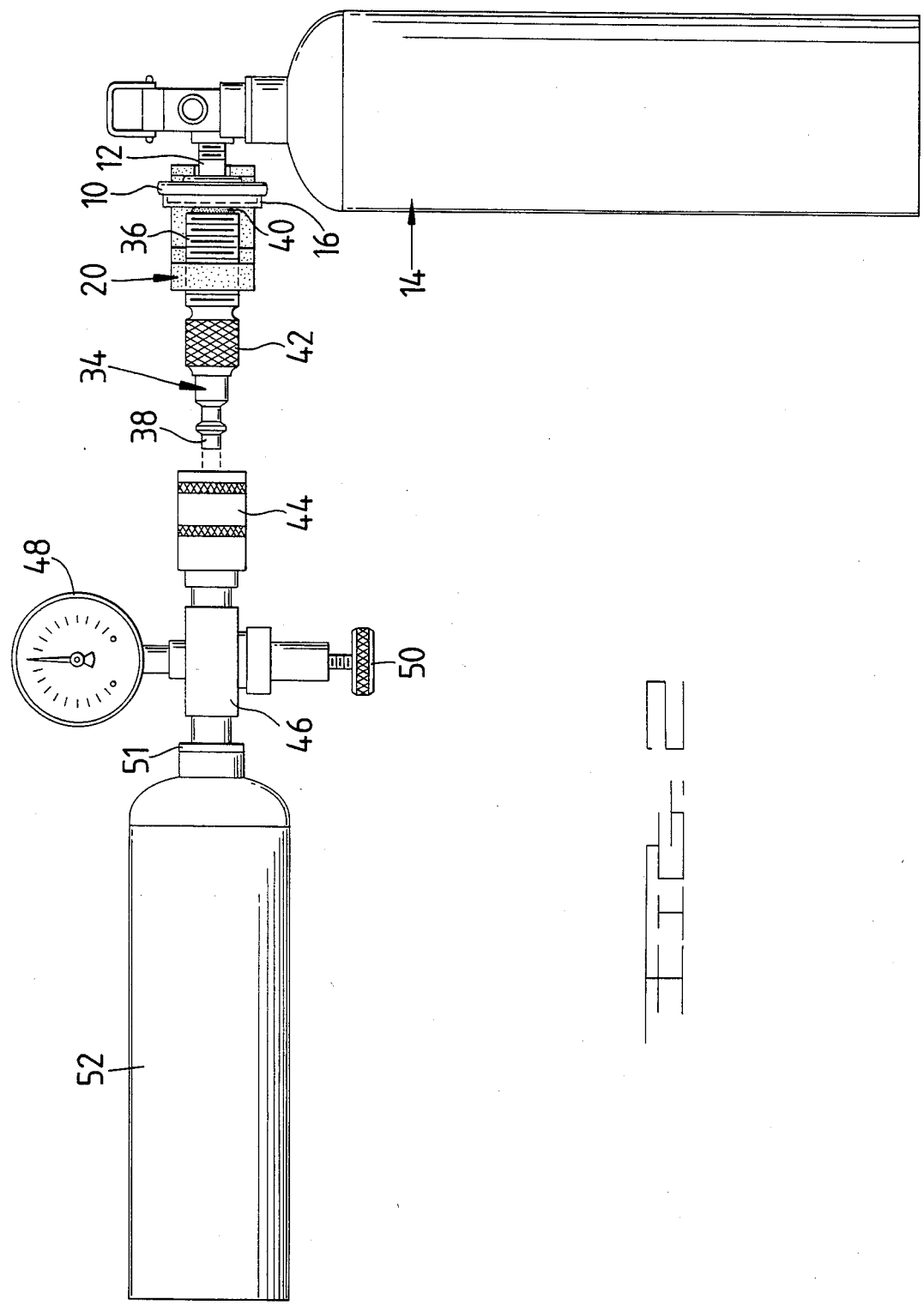
FIG. 2 is a side elevational view of the apparatus including the charging canister.

A conduit connector 34 having an axial bore, an externally threaded end portion 36, and an end 38 adapted for a quick release collar fitting threadedly engages the threaded bore 28 of extension 22. An annular resilient seal 40 is mounted at the end of threaded end portion 36 of connector 34 and projects therefrom, as shown in FIG. 2. Threaded end portion 36 is threaded to a sufficient length to allow the conduit connector 34 to urge the seal 40 into air-tight engagement with face cover 16 when gauge 10 is positioned within bracket 20. When so engaged seal 40 surrounds the perforations 18 such that air passage thereto may occur only through the conduit connector 34. Seal 40 is of sufficient cross sectional area to provide a dispersed loading effect on the face cover 16 so that the captive pressure exerted thereon by the tightening of conduit connector 34 does not damage the face cover 16. Conduit connector 34 is provided with a knurled collar 42 to allow hand tightening of the connector through threaded bore 28 into cooperative position with the face cover 16. End 38 of the connector 34 is configured as the male jack for a conventional quick release connector 44. The quick release connector 44 is integrated onto the output of a pressure regulator 46 which has integrated thereto a pressure gauge 48 which is used to indicate the pressure induced in conduit connector 34 and inwardly of the face cover 16 by pressure regulator 46. The pressure thus induced may be raised or lowered through the action of valve adjustment means 50 located on the pressure regulator 46. Both pressure regulator 46 and quick release connector 44 are well known components and further description of their characteristics of construction and operation are deemed unnecessary to an understanding of the invention.

Pressure regulator 46 is connected to the outlet 51 of pressurized canister 52 which contains a sufficient volume of pressurized gas to allow multiple utilizations of the instant device. The gas of preference is nitrogen subjected to a pressure of up to 1,000 psi within canister 52. Nitrogen is the gas of preference inasmuch as many storage canister applications utilize nitrogen as the propellant gas, therefore nitrogen would be a noncontaminating test gas for introduction into the gauge 10. Canister 52 is a small, portable canister of standard design and configuration and of variable capacity as deemed appropriate to the needs of the particular utilization of the instant invention.

Utilization of the instant device is straightforward. Conduit connector 34 is withdrawn in threaded bore 28 a sufficient distance to allow bracket 20 to fit comfortably over the gauge 10 such that neck 12 fits within slot 30 of the second extension 24. Extension 24 is seated against the back of gauge 10 which is positioned within bracket 20 for cooperation with connector 34. Conduit connector 34 is then advanced through the threaded bore 28 such that annular seal 40 is urged against the face cover 16 to form an air-tight seal about the perforations 18 such that gaseous communication through perforations 18 into the cavity inwardly of the face cover 16 is provided only through conduit connector 34. Once a satisfactory seal between face cover 16 and resilient annular seal 40 has been established cannister 52 and pressure regulator 46 are connected to conduit connector 34 at the end 38 thereof by quick release connector 44. Pressure regulator 46 is then utilized to introduce pressurized gas inwardly of the face cover 16 via conduit connector 36. As the pressure of the gas within face cover 16 increases the differential between the pressure of the gas within cylinder 14 and face cover 16 decreases thereby causing gauge 10 to indicate a decreased pressure. When a pressure within face cover 16 has been reached which is equal to the pressure within cylinder 14 gauge 10 should read zero. At this point the pressure of the gas introduced into conduit connector 34 and inwardly of face cover 16 is indicated by pressure gauge 48. The indication on pressure gauge 48 is also the equivalent of the gas pressure within cylinder 14 and should equal the pressure indicated by gauge 10 in a non-test condition. Pressure regulator 46 is then utilized to reduce the pressure within conduit connector 34 and face cover 16. As this pressure is reduced gauge 10 should indicate an increase in pressure corresponding to the increased differential between the internal pressure of cylinder 14 and face cover 16. When the pressure within the face cover 16 once again reaches atmospheric pressure, pressure gauge 48 should read zero and the gauge under test should read the pressure of the gas contained within cylinder 14. At this point the test of the gauge and the cylinder contents is complete, therefore, cylinder 52 and pressure regulator 46 may be rexoved from connector 34 at quick release connector 44. Conduit connector 34 is then rotated to withdraw annular seal 40 from the face cover 16, and bracket 20 may then be removed from gauge 10.

It should be noted that under normal circumstances neither gauge 10 nor cylinder 14 need to be removed from their normal storage location nor is it necessary for the person making the test to handle the cylinder or the gauge in any manner except to place bracket 20 about gauge 10. Furthermore, the instant device and its method of utilization give a positive indication of the operability and accuracy of gauge 10 as well as giving a positive indication of the pressure within cylinder 14, thus providing a quick and reliable means for performing routine maintenance checks of the gauge and cylinder. It should also be noted that the diameter of the gauge will not ordinarily be a determinate inasmuch as extensions 22 and 24 may be sized to accommodate any diameter gauge in accordance with the needs of the user. That is to say, the important determinate is that slot 30 is of sufficient length to allow conduit connector 34 to be positioned so as to place annular seal 40 about the perforations 18 in the face cover of the gauge.

It should be recognized that a novel device for the quick and accurate testing of safety equipment, such as fire extinguishers, and other pressurized gas canisters has been disclosed.

While I have shown my invention in but one form, it will be obvious to those skilled in the art that it is not so limited but is susceptible of various changes and modifications without departing from the spirit thereof.

What I claim is:

1. An apparatus for insitu testing of a gas pressure gauge having at least one pressure equalizing perforation therein comprising, in combination:
    (a) a connector unit adapted to engage said gas pressure gauge and cooperate with said pressure equalizing perforation, including a generally U-shaped bracket having first and second extending members connected by a base member with said first extending member having a threaded bore therethrough perpendicular to the adjacent surface of said second extending member and with said second extending member having an outwardly opening slot therein;
    (b) a conduit connector externally threaded at one end thereof for threaded engagement with said threaded bore;
    (c) injecting means carried by said connector unit in communication with said pressure equalizing perforation for injecting pressurized gas into said gauge through said pressure equalizing perforation; and
    (d) means operatively connected to said injecting means for indicating the pressure of said gas injected into said gauge.

2. The apparatus of claim 1 wherein said conduit connector has an annular resilient seal projecting from said one end thereof for compression between said conduit connector and said gauge, about said perforation.

3. The apparatus of claim 1 wherein said outwardly opening slot in said second extending member defines spaced apart legs connected by a base which serves to contact said gauge on the rear thereof.

4. The apparatus of claim 1 wherein said gauge has a face and said means for injecting pressurized gas into said face of said gauge comprises:
 (a) pressure regulator means operably connected to said conduit connector external said bracket for injecting gas therethrough; and
 (b) a portable supply of compressed gas operably connected to said regulator means for introducing said gas therethrough.

5. An apparatus for testing gas pressure gauges on storage canisters by gaseous injection thereinto comprising, in combination:
 (a) a substantially U-shaped bracket having a first extending member, a second extending member parallel thereto, and a base member connecting said first and second extending members, said first extending member having a threaded bore therethrough aligned perpendicular to the adjacent surface of said second extending member, said second extending member having an outwardly opening slot;
 (b) a conduit connector having an axial bore and being externally threaded for threaded engagement with said bore in said first extending member and having a first end terminating within said U-shaped bracket when said conduit connector is in threaded engagement therewith, said first end thereby engaging said gauge for gaseous injection thereinto, and a second end extending from said bracket;
 (c) pressure regulating means removably connected to said conduit connection at said second end thereof,
 (d) a gas pressure gauge operably connected to said regulator means and conduit connector to indicate pressure within said conduit connector; and
 (e) portable storage means charged with high pressure gas operably connected to said regulator means for discharge of said gas therethrough into said conduit connector.

6. The apparatus of claim 5 wherein said second extending member has a recessed shoulder about said outwardly opening slot.

7. The apparatus of claim 5 wherein said conduit connector terminates in a resilient annular seal projecting from said first end thereof.

8. The apparatus of claim 5 wherein said high pressure gas is nitrogen.

* * * * *